Feb. 20, 1968    B. COLDING    3,369,283
CUTTING INSERT FOR CHIP CUTTING MACHINING AND MEANS FOR
MANUFACTURING SUCH CUTTING INSERTS
Filed Jan. 27, 1965
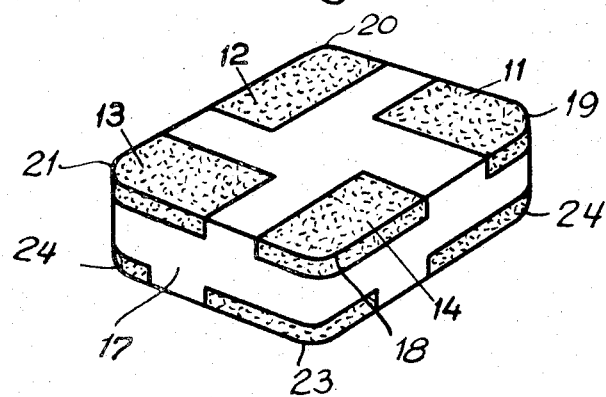
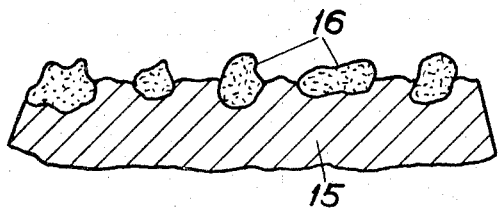
INVENTOR.
BERTIL COLDING
BY Bailey, Stephenst
   Huettig United States Patent Office 3,369,283
Patented Feb. 20, 1968

3,369,283
CUTTING INSERT FOR CHIP CUTTING MACHINING AND MEANS FOR MANUFACTURING SUCH CUTTING INSERTS
Bertil Colding, Vasteras, Sweden, assignor, by mesne assignments, to Diadur Aktiebolag, Robertsfors, Sweden, a corporation of Sweden
Filed Jan. 27, 1965, Ser. No. 428,503
Claims priority, application Sweden, Feb. 6, 1964, 1,433/64
9 Claims. (Cl. 29—95)

ABSTRACT OF THE DISCLOSURE

A cutting insert for chip cutting comprises a metallic matrix with diamond particles having an average size below 2 mm. pressed into the cutting edge; the matrix has a hardness of at least 40 Rockwell C, but less than that of the diamond particles; the particles cover at least 10 percent of the edge surface; the article may be produced by pressing or spraying the diamond particles into the matrix, which may then be hardened.

The present invention relates to a cutting insert with at least one cutting edge for chip cutting machining and to a means for manufacturing such cutting inserts.

For machining material for chip cutting machining, it is necessary to have material of great toughness and also great wearing strength. It is desirable to combine the great toughness of high speed steel with the great wearing strength of the diamond, but up to now this has not been possible, in any case not without very great costs which make the use of such material impossible for industrial chip cutting machining.

In grinding wheels and similar tools, diamond grains have been used, fastened in a frame of plastic or similar material with the same hardness and also of copper alloy and soft steel. In grinding wheels, the separate diamond grains are made in the form of small cutting edges which each machine the material to be worked by means of chip cutting. The relative speed during grinding is 2–10 times greater than for example during chip cutting machining with hard metal. Since particularly high energy per unit of volume is necessary for chip cutting during grinding (chip upsetting about 10) as against turning (chip upsetting about 2) and high relative speed, the edge temperature in the diffusion layer on the points of the grains becomes between 1500–2000° C. during grinding. With conventional hard metal the temperature in the diffusion layer between chips and hardmetal is a maximum of around 1200° C. With smaller friction coefficients, for example if the chip slides over a diamond impregnated edge, the rise in temperature can be reduced during turning with impregnated edges as compared to hard metal turning.

The separate grains do not machine the working piece surface and they will thus be rounded and function as sliding edges for the working piece chip. The chip is quickly sheared off in such a machining just before the sliding against the diamond grain takes place. Friction and normal force has now become about 10 times greater than in grinding, so that considerably greater demands of pressure resistance are put on the chip cutting machining tool. The supporting bodies which are used with grinding wheels are thus completely inadequate in this connection. On the other hand it is difficult to fasten diamond grains in a hard frame.

Among other things the invention provides a cutting insert in which the great wearing strength of the diamond grains are combined with the toughness of high speed steel. The cutting insert has at least one cutting edge and consists of a matrix and a large number of diamond grains pressed into the matrix at least at the cutting edge. The cutting insert is characterized in that its matrix consists of a metal or metal alloy with a final hardness of at least 40 Rockwell C, preferably at least 55 Rockwell C, but below that of the diamond grains, that the diamond grains at the cutting edge cover at least one percent, preferably at least ten percent of its surface, and that the average grain size of the diamond grains is less than 2 mm. The hardness of the matrix material makes it possible to take up the pressure force during machining. The surface to which diamonds are attached should have a performance with the following qualities.

The distances between the different points of the diamonds which serve as sliding points during turning for the chips should not be too long to make a satisfactory anti-friction action possible. The distances between the diamond grains may, however, not be too small, as otherwise the material between the grains would break during the pressing in of the grains and ruptures or the like would arise, and diamonds would loosen afterwards, for example during turning. Thus, it is necessary to find a satisfactory compromise between these two demands. The average size of the diamond grains makes it possible for them to be pressed into the matrix without damage to the matrix or the grains. The matrix can, for example, consist of high speed steel, i.e. ground 0.8% C, 4.5% Cr, 19–20% W, 1.5% V and possibly 1.5% Mo and 5–10% Co. According to another embodiment the matrix can consist of hard metal of the type of tungsten carbide and a bonding metal, usually cobalt.

The invention also provides a method for manufacturing such cutting inserts and this method is characterised in that, on a matrix of a relatively hard metal or metal alloy suitably covered with a binding means, a layer of diamond grains with greater hardness than that of the matrix and with an average grain size of at least 2 mm. and a covering density of at least one percent, suitably 10–50 percent, of the corresponding matrix surface is laid, after which a stamp under a pressure of a size corresponding to the active area of the matrix material (turned towards the right) with high speed steel, up to at least 900 kp./mm.$^2$, suitably around 950 kp./mm.$^2$ (turned toward the left) is pressed against the diamond grain layer and the first mentioned matrix, so that the diamond grains penetrate at least into the matrix surface. This method is economically advantageous and makes possible an effective and quick fastening of the grains into the matrix surface. The utilizing of the grains, i.e. the percentage of the grains which fastens in the matrix also becomes great.

The method can be varied, for example by using unhardened material in the matrix, pressing diamond grains under low pressure into the matrix and then hardening the matrix. By means of this treatment the matrix becomes hard, but the relatively short hardening time means that there can be no graphitising of the diamond grains.

The invention with which the method is concerned is exemplified in the accompanying figures, of which FIG. 1 shows a carrier 17 with eight cutting inserts arranged according to the invention and FIG. 2 an enlargement of one cutting insert provided with diamond grains.

A cutting steel is shown in FIG. 1. There are eight cutting inserts fixed in a carrier 17. The cutting steel is a so-called turnable cutting steel, since in the eight corners there are cutting inserts 11, 12, 13, 14, each cutting insert exactly in the corner forming a cutting edge (18, 19, 20, 21, 22, 23, 24) so that this cutting steel in FIG. 1 can present eight cutting edges without regrinding.

In the case shown the cutting steel is substantially parallelepipedral, but all shapes of cutting steels are feasible, of course. The cutting steel according to the above are used complete or consist of, for example eight micro cutting inserts with impressed diamonds, which cutting inserts are fastened in the carrier of the turnable cutting steel.

The cutting insert according to the invention consists of a matrix 15 (FIG. 2) of a metal or metal alloy of a hardness of at least 55 Rockwell C, but lower than that of the diamond grains, the latter in order to make possible the pressing of the grains into the matrix. In the surface of the matrix in the manner shown below or by means of spraying, blasting or in another way, diamonds with at the most an average grain size of 2 mm. are inserted. As can be seen from FIG. 2 the covering should be relatively thin but at least one percent, suitably 10–50 percent of the surface of the matrix. The diamond grains are fastened in the matrix at its cutting edges or its cutting edge (if there is only one). The reason for this is not too compact covering is that, during the impressing of the grains, the matrix parts between the grains could be damaged, so that the grains would then be able to fall out.

According to an embodiment example of a cutting insert according to the above, the grains have an average diameter of around $82\mu$ and a grain density of 15,000 grains/cm.$^2$. The diamond covering surface per cutting edge is around 31 mm.$^2$. The matrix is made of high speed steel with a hardness of 66.6 Rockwell C. The construction takes place as above.

Instead of these diamond grains, somewhat finer grains can be used with an average diameter around $62\mu$ in the same type of matrix. The matrix material according to the above can of course be of many kinds, all within the limits of the hardness, for example hard metal (WC+Co) or another relatively highly strength-resistant and heat resistant alloy.

The cutting inserts according to the above can be manufactured in many ways, for example according to the following:

A high speed steel plate (matrix) is coated with glue and a layer of diamond grains with an average diameter of $124\mu$ is laid upon this glue layer. During the later pressing, these grains are crushed to about half their original size. 48 mm.$^2$ of the plate is covered with a covering density of around 35 percent of the total covered matrix surface. Against this surface in the matrix a similar matrix is laid and these two matrixes are pressed together in a press with a pressure reaching up to 16–20 tons. The speed of the pressure increase is 100 kp./mm.$^2$/minute and at the contact of the two surfaces the pressure per mm.$^2$ is 950 kp., which accounts for the diamond grains being pressed into the matrix surfaces. 950 kp./mm.$^2$ corresponds to about the yield point of the high speed steel and generally the pressure operations should be stopped before this value, which as is known is different for different matrix material. The pressure can also momentarily produce the maximum value at the beginning of the operation, for example by the use of high speed forming.

Of the grains used in the embodiment mentioned, 21% will be on the upper matrix and 25% on the lower, while the remainder are washed away or go away as waste.

The grain size can be varied within the said examples between 92 and $184\mu$ before the pressing. The matrix surface can after pressing be covered with an additional binding means, for example a nitrate layer with the intention of improving the fastening of the diamond grains.

In a modification of this means, the grains can be impressed or sprayed into a matrix of unhardened material at a high temperature. After final setting in, the matrix is hardened for a short time to a hardness of at least 40 Rockwell C, suitably at least 55 Rockwell C, thus not so long that the grains become graphitized.

The pressing conditions can be varied both concerning the bias of the matrix, for example the use of hydrostatic pressure, and concerning the pressing speed, for example by explosion forming.

It is possible, for example in the pressing of high speed steel to use hard metal as a press plate in order to produce a deeper impression of the diamonds in the high speed steel than would be the case with high speed steel—high speed steel.

The cutting insert functions during chip cutting machining so that the grains which are rounded on the outside slide towards the chip and the working surface under high pressure, which is thus taken up by the hard matrix. The chip is sheared from the working piece just before it slides towards the diamonds, so that substantially no machining like grinding, i.e. cutting with small cutting edges takes place. The hardness of the matrix and selected thinness of the diamond grains are thus of great importance.

Sharp points of impressed outwardly turning diamond grains can, by means of, for example, lipping, become rounded so that sliding is improved.

These cutting inserts can of course be made for and said manufacturing method be used in the manufacture of saw blades, rotating rock drills, dentist's drills, long hole drills, rope drills, etc. as well as cutters, spiral drills, shell drills, punching tools, etc. all within the scope of the following claims.

What is claimed is:

1. Cutting insert with at least one cutting edge for chip cutting machining, said insert comprising a matrix and a plurality of diamond particles pressed into the matrix at least at the cutting edge, said matrix consisting essentially of a metal or metal alloy with a hardness of at least 40 Rockwell C, but less than the hardness of the diamond particles, said particles at the edge covering at least ten percent of the edge surface and having an average size below 2 mm.

2. Cutting insert with at least one cutting edge for chip cutting machining, said insert comprising a matrix and a plurality of diamond particles pressed into the matrix at least at the cutting edge, said matrix consisting essentially of a metal or metal alloy with a hardness of at least 55 Rockwell C, but less than the hardness of the diamond particles, said particles at the edge covering at least ten percent of the edge surface and having an average size below 2 mm.

3. Cutting insert as claimed in claim 2, said matrix consisting essentially of hard metal, comprising hard material particles and a binding metal.

4. Cutting insert as claimed in claim 2, said matrix consisting essentially of high speed steel.

5. Method of manufacturing cutting inserts, comprising the steps of putting diamond particles upon a matrix of a metal or metal alloy with a hardness of at least 40 Rockwell C, said particles having a higher hardness than the matrix and an average size below 2 mm., said covering of particles covering 1–50 percent of the covered matrix surface, thereafter pressing a pressing tool with a pressure of a value in the area of the yield strength of the matrix material against the diamond particles and the matrix, thereby pressing the diamond particles at least partially into the matrix surface.

6. Method of manufacturing cutting inserts, comprising the steps of pressing a covering of diamond particles upon a matrix consisting essentially of at least partially unhardened metal or metal alloy, said metal or alloy in hardened state having a hardness of at least 40 Rockwell C, but less than the hardness of the diamond particles, said covering of diamond particles having an average grain size below 2 mm., said particles covering at least ten percent of the covered surface of the matrix, and thereafter hardening said insert within a short time.

7. Method of manufacturing cutting inserts, comprising the steps of spraying a covering of diamond particles upon a matrix consisting essentially of at least partially unhardened metal or metal alloy, said metal or alloy in hardened state having a hardness of at least 40 Rockwell C, but less than the hardness of the diamond particles, said covering of diamond particles having an average grain size below 2 mm., said particles covering at least ten percent of the covered surface of the matrix, and thereafter hardening said insert within a short time.

8. Method of manufacturing cutting inserts, comprising the steps of pressing a covering of diamond particles upon a matrix consisting essentially of at least partially unhardened metal or metal alloy, said metal or alloy in hardened state having a hardness of at least 55 Rockwell C, but less than the hardness of the diamond particles, said covering of diamond particles having an average grain size below 2 mm., said particles covering at least ten percent of the covered surface of the matrix, and thereafter hardening said insert within a short time.

9. Method of manufacturing cutting inserts, comprising the steps of spraying a covering of diamond particles upon a matrix consisting essentially of at least partially unhardened metal or metal alloy, said metal or alloy in hardened state having a hardness of at least 55 Rockwell C, but less than the hardness of the diamond particles, said covering of diamond particles having an average grain size below 2 mm., said particles covering at least ten percent of the covered surface of the matrix, and thereafter hardening said insert within a short time.

No references cited.

HARRISON L. HINSON, *Primary Examiner.*